United States Patent
LeBeane et al.

(10) Patent No.: US 10,089,155 B2
(45) Date of Patent: Oct. 2, 2018

(54) POWER AWARE WORK STEALING

(71) Applicant: Advanced Micro Devices, Inc., Sunnyvale, CA (US)

(72) Inventors: Michael W. LeBeane, Austin, TX (US); Deepak Majeti, Austin, TX (US); Mauricio Breternitz, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 14/862,038

(22) Filed: Sep. 22, 2015

(65) Prior Publication Data
US 2017/0083382 A1   Mar. 23, 2017

(51) Int. Cl.
G06F 9/50 (2006.01)
G06F 9/48 (2006.01)
G06F 1/32 (2006.01)
G06F 1/20 (2006.01)

(52) U.S. Cl.
CPC .......... *G06F 9/5094* (2013.01); *G06F 1/206* (2013.01); *G06F 1/329* (2013.01); *G06F 1/3243* (2013.01); *G06F 1/3293* (2013.01); *G06F 9/4856* (2013.01); *G06F 9/4893* (2013.01); *Y02D 10/152* (2018.01); *Y02D 10/16* (2018.01); *Y02D 10/24* (2018.01)

(58) Field of Classification Search
CPC .................................................... G06F 9/5094
See application file for complete search history.

(56) References Cited

U.S. PATENT DOCUMENTS

| 5,941,991 A * | 8/1999 | Kageshima ............. G06F 11/24 703/20 |
| 2009/0222654 A1* | 9/2009 | Hum ...................... G06F 13/24 713/100 |
| 2010/0146513 A1* | 6/2010 | Song ..................... G06F 1/3203 718/104 |
| 2013/0167154 A1* | 6/2013 | Peng ..................... G06F 9/5083 718/105 |
| 2013/0283277 A1* | 10/2013 | Cai ........................ G06F 1/329 718/102 |
| 2014/0173312 A1* | 6/2014 | Shippy .................. G06F 9/5094 713/323 |
| 2016/0154677 A1* | 6/2016 | Barik ................... G06F 13/4239 718/105 |
| 2016/0239074 A1* | 8/2016 | Lee ....................... G06F 1/3287 |

OTHER PUBLICATIONS

Blumofe, R. D., Joerg, C. F., Kuszmaul, B. C., Leiserson, C. E., Randall, K. H., & Zhou, Y. "Cilk: An efficient multithreaded runtime system" Journal of Parallel and Distributed Computing, 37(1), (1996), pp. 55-69.

* cited by examiner

Primary Examiner — Charlie Sun (57) ABSTRACT

First and second processor cores are configured to concurrently execute tasks. A scheduler is configured to schedule tasks for execution by the first and second processor cores. The first processor core is configured to selectively steal a task that was previously scheduled for execution by the second processor core based on additional power consumption incurred by migrating the task from the second processor core to the first processor core.

16 Claims, 4 Drawing Sheets

POWER AWARE WORK STEALING

BACKGROUND

Field of the Disclosure

The present disclosure relates generally to processing systems and, more particularly, to scheduling tasks for execution in processing systems.

Description of the Related Art

Processing systems can include more than one processor core to execute instructions concurrently or in parallel. For example, the central processing units (CPUs) in personal computers frequently include four or more processor cores, servers can implement numerous CPUs, and computing clusters are formed of numerous interconnected servers. Schedulers attempt to maximize the performance of these entities, e.g., by scheduling different tasks of one or more programs to run concurrently on different processor cores to minimize the total execution time of the programs. However, schedulers are not able to predict precisely how long it will take a processor core to complete execution of a scheduled thread or task. Thus, load imbalances may occur in which some processor cores may remain idle while other processor cores have a backlog of scheduled tasks waiting to be completed. For example, procedures that are scheduled for execution by a processor during a multithreaded computation may include a parent thread that spawns one or more child threads, which provide return values to successor threads that are also spawned by the parent thread. The processor must therefore execute the child thread to return a value to the successor thread before the procedure can make additional progress. The total execution time of the procedure may therefore depend on the number of generations of child threads, which may be difficult to predict accurately.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Schedulers can dynamically reassign previously scheduled tasks to other processors using a process known as "work stealing." Work stealing allows idle processors to execute, or "steal," tasks that were previously scheduled for execution by other active processor cores, thereby reducing the overall execution time by spreading the workload over multiple processor cores. In a work stealing scheduler, each processor core has a queue of tasks to perform. Tasks that are spawned by a parent thread or task that is executing on the processor core are initially added to the queue of that processor core. When a processor core completes all the tasks in its queue, the processor core looks at the queues of other processor cores and "steals" the queued work if stealing the task is expected to reduce the overall execution time of the procedure. However, conventional work stealing is only designed to optimize the overall execution time of a procedure and does not consider the potential costs of additional power consumption or energy consumption due to migrating the tasks between the processor cores.

The energy efficiency of processor systems such as personal computers, servers, or computing clusters that execute procedures on multiple processor cores can be improved if a first processor core determines whether to steal a task that was previously scheduled for execution by a second processor core based on additional power consumption incurred by migrating the task from the second processor core to the first processor core. In some embodiments, the additional power consumption is determined by subtracting a power consumption savings that results if the first processor core does not steal the work (and instead enters an idle mode) from power consumption costs such as the power consumption needed to transfer information between the processor cores and power consumption needed to retrieve information from a memory or disk. The additional power consumption may also account for differences in characteristics of the first and second processor cores such as different rates of active mode power consumption by the first and second processor cores.

In some embodiments, the task is transferred from the second processor core to the first processor core based on a comparison of estimated values of a function of an execution time and a power overhead for the cases in which the task is or is not stolen by the first processor core. For example, the task may be transferred if the estimated value of the function is larger when the first processor core steals the work from the second processor core. Accounting for the power consumption overhead of work stealing may also help the processing system avoid thermal emergencies that can result from excessive power consumption rates in a processor core. As used herein, the term "thermal emergency" refers to a temperature of a processor core exceeding a thermal emergency threshold temperature that indicates a potential for damage to the processor core due to overheating.

Figure 1:
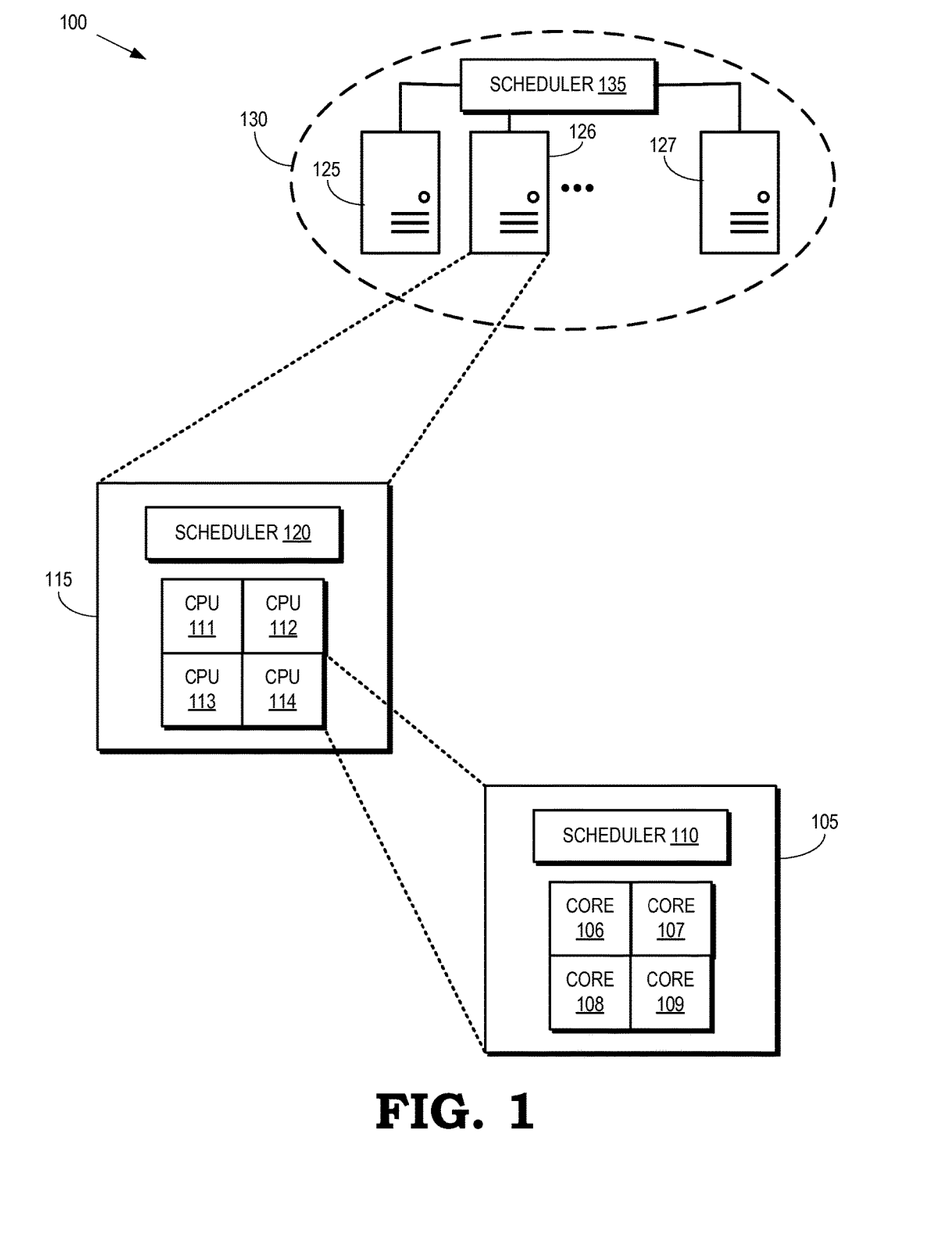
FIG. 1 is a block diagram of a processing system according to some embodiments.

FIG. 1 is a block diagram of a processing system 100 according to some embodiments. The processing system 100 includes a processing unit 105, which may be a central processing unit (CPU), a graphics processing unit (GPU), an accelerated processing unit (APU), an application specific integrated circuit (ASIC), a field programmable gate array (FPGA), and the like. The processing unit 105 includes a plurality of processor cores 106, 107, 108, 109 that are referred to collectively as "the processor cores 106-109." The processor cores 106-109 are configured to execute tasks independently, concurrently, or in parallel. As used herein, the term "task" is used to indicate a portion of a program or code that can be executed by one or more of the processor cores 106-109. A task may be an instruction, an operation, a thread, a code fragment, a program block, and the like.

The processing unit 105 implements a scheduler 110 that is used to schedule tasks for execution by the processor cores 106-109. The scheduler 110 is implemented using software or firmware and associated hardware that executes the software or firmware. The scheduler 110 may schedule the tasks based on a scheduling algorithm, which may select tasks for scheduling to the processor cores 106-109 using techniques such as round-robin, proportional fairness, priority weighting, and the like. The processor cores 106-109 may also provide feedback to the scheduler 110 such as feedback indicating completion of one or more tasks that were previously scheduled for execution by the processor cores 106-109. The scheduler 110 may use the feedback when determining whether to assign additional tasks to the processor cores 106-109. As discussed herein, the scheduler 110 attempts to schedule tasks to the processor cores 106-109 to optimize performance or reduce execution time. For example, scheduling two tasks to run on a single processor core 106 may increase the overall execution time by a factor of two relative to scheduling the same two tasks to run concurrently on two processor cores 106, 107.

The scheduler 110 also attempts to schedule tasks to reduce the idle time of the processor cores 106-109. However, load imbalances may occur in which one or more of the processor cores 106-109 remains idle while other processor cores 106-109 are completing execution of a backlog of scheduled tasks. For example, the processor cores 106-109 may support multithreaded operation and consequently threads executing on the processor cores 106-109 may spawn additional child threads or successor threads. The scheduler 110 schedules the child threads and successor threads to the same processor core that is executing the parent thread, which may lead to a backlog of scheduled tasks on the processor core. Since different procedures may spawn different numbers or levels of child and successor threads, the backlogs may be different on the different processor cores 106-109. The scheduler 110 may not be able to predict the number or depth of the additional spawned threads and the resulting load imbalances may cause some of the processor cores 106-109 to enter an idle mode while waiting for the procedures that spawned the threads to complete. The idle processor cores 106-109 may reduce the overall performance of the processing unit 105 and may increase the execution time of the procedures that are being executed by the processing unit 105.

The processing unit 105 implements work stealing to improve the performance of the processor cores 106-109 and the scheduler 110. For example, an idle processor core 106 may steal tasks from an active processor core 109 that has a backlog of unexecuted tasks. However, work stealing also incurs additional overhead due to the power required to perform operations related to work stealing. For example, work stealing may incur power consumption costs due to the additional power consumption required to move a task (and any associated information) between the processor cores 106-109. For another example, bypassing work stealing may reduce power consumption (relative to performing the work stealing) by allowing one or more of the processor cores 106-109 to enter an idle mode, thereby saving an amount of power that is approximately equal to a difference between the power consumption rate in an active mode and the power consumption rate in the idle mode. The power consumption costs or savings may also be affected by different power consumption rates for different types of processor cores 106-109 or due to different operating points (e.g., different operating voltages or frequencies) of the processor cores 106-109. The scheduler 110 may therefore selectively steal tasks that were previously scheduled for execution by one or more of the processor cores 106-109 based on additional power consumption incurred by migrating the task between the participating processor cores 106-109.

A server 115 implements CPUs 111, 112, 113, 114 (referred to collectively as "the CPUs 111-114") to perform various processes such as executing instructions concurrently, in parallel, or independently. Some embodiments of the CPUs 111-114 are implemented using the processing unit 105. The server 115 also implements a scheduler 120 that is configured to schedule tasks for execution by the CPUs 111-114. The scheduler 120 is implemented using software or firmware and associated hardware that executes the software or firmware. In one embodiment, the scheduler 120 performs the scheduling in conjunction with the scheduler 110 so that the schedulers 110, 120 operate as a distributed scheduling function. In another embodiment, the scheduler 120 performs the scheduling of tasks on the processor cores of the CPUs 111-114 instead of using the scheduler 110 so that the scheduler 120 operates as a centralized scheduling function. The scheduler 120 (perhaps in conjunction with the scheduler 110) implements work stealing between processor cores on the CPUs 111-114. Additional power consumption overhead may be incurred by work stealing between processor cores on different CPUs 111-114. For example, additional power may be required to migrate tasks (and associated information) between the different CPUs 111-114. These power consumption costs may be considered by the scheduler 120 before deciding whether to perform work stealing.

A computing cluster 130 includes a plurality of servers 125, 126, 127 (referred to collectively as "the servers 125-127") that are used to perform processes such as executing instructions concurrently, in parallel, or independently. The servers 125-127 may be implemented using some embodiments of the server 115. The computing cluster 130 also implements a scheduler 135 that is configured to schedule tasks for execution by the CPUs 111-114. The scheduler 135 is implemented using software or firmware and associated hardware that executes the software or firmware. The scheduler 135 may be implemented in a stand-alone processing system or it may be implemented in one or more of the servers 125-127. In one embodiment, the scheduler 135 performs the scheduling in conjunction with the scheduler 120 or the scheduler 110 so that the schedulers 110, 120, 135 operate as a distributed scheduling function. In another embodiment, the scheduler 135 performs the scheduling of tasks on the processor cores of the CPUs in the servers 125-127 instead of using the scheduler 110 or the scheduler 120 so that the scheduler 135 operates as a centralized scheduling function. The scheduler 135 (perhaps in conjunction with the scheduler 110 or the scheduler 120) implements work stealing between processor cores on the CPUs of the servers 125-127. Additional power consumption overhead may be incurred by work stealing between processor cores on different servers 125-127. For example, additional power may be required to migrate tasks (and associated information) over networks that interconnect the different servers 125-127. These power consumption costs may be considered by the scheduler 135 before deciding whether to perform work stealing.

Work stealing may also be performed based on thermal properties or characteristics of the processor cores 106-109 or other entities in the processing system 100. For example, any available processor cores 106-109 may steal a task from any other processor core 106-109 that is experiencing a thermal emergency, e.g., as indicated by a core temperature exceeding a thermal emergency threshold. For another example, a first one of the processor cores 106-109 may steal a task from a second one of the processor cores 106-109 based on a comparison of first temperatures of the first processor core and the second processor core that are estimated assuming that the task is stolen and second temperatures of the first processor core and the second processor core that are estimated assuming that the task is not stolen. The task may be stolen if the first estimated temperatures are lower than the second estimated temperatures. Tasks may also be stolen if the first estimated temperatures are lower than corresponding temperature thresholds that indicate a potential thermal emergency. Tasks may also be stolen if the second estimated temperatures are higher than corresponding temperature thresholds that indicate a potential thermal emergency or under other thermal conditions. The example criteria described above may be used in various combinations to determine whether to steal a task. Work stealing may therefore be used to address or avoid thermal emergencies in the processing system 100.

Figure 2:
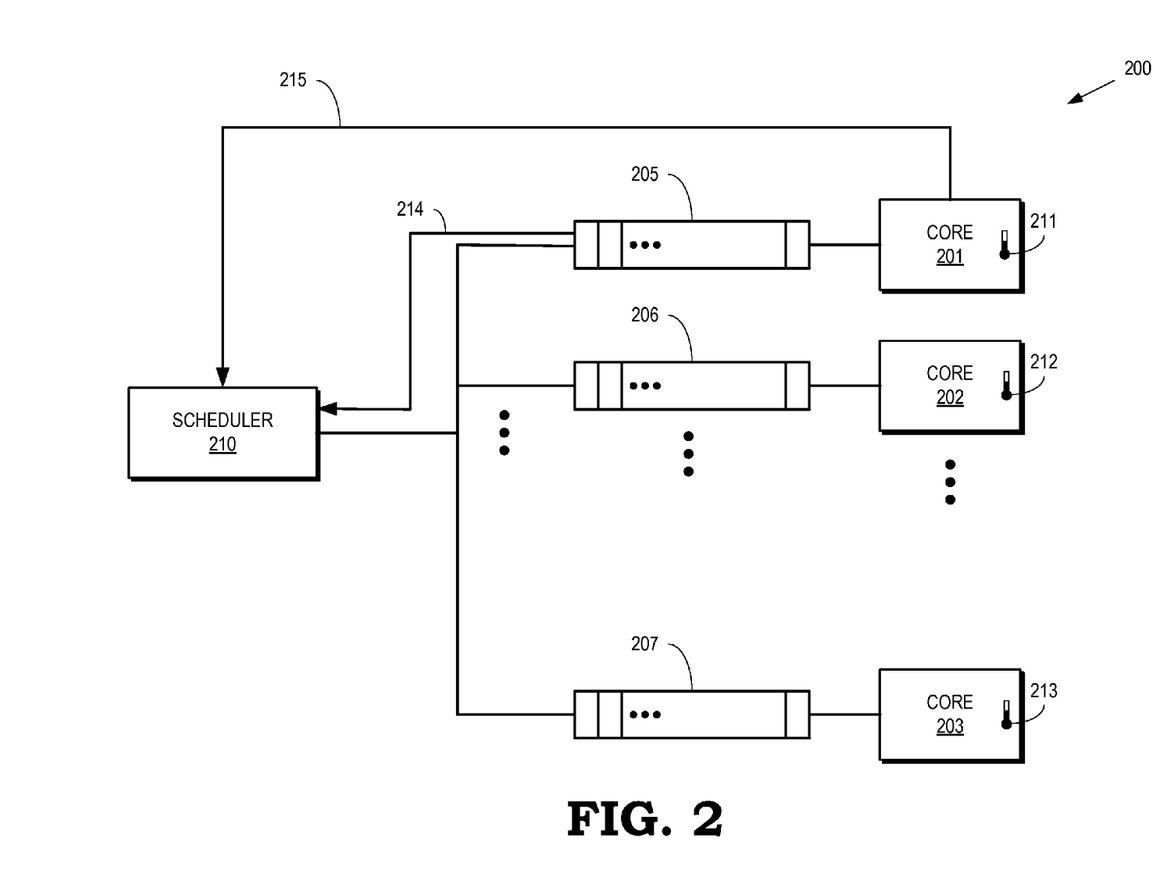
FIG. 2 is a block diagram of a processing system that includes a plurality of processor cores according to some embodiments.

FIG. 2 is a block diagram of a processing system 200 that includes a plurality of processor cores 201, 202, 203 according to some embodiments. The processor cores 201-203 may represent, for example, embodiments of the processor cores 106-109, the CPUs 111-114, or the servers 125-127 shown in FIG. 1. The processor cores 201-203 are associated with corresponding queues 205, 206, 207 (referred to collectively as "the queues 205-207") that store tasks for subsequent execution by the corresponding processor cores 201-203. A scheduler 210 provides tasks to the queues 205-207 in accordance with a scheduling algorithm implemented by the scheduler 210. The scheduler 210 may receive feedback from the queues 205-207, as indicated by the arrow 214. In the interest of clarity, FIG. 2 includes a single feedback arrow 214 from the queue 205 but feedback may also be received from the queues 206 and 207. Examples of feedback information include information indicating fullness of the queues 205-207, overflow of the queues 205-207, or underflow of the queues 205-207. Scheduling decisions may be made based on the feedback. The processor cores 201-203 access the tasks from the corresponding queues 205-207 for execution. Some embodiments of the queues 205-207 may therefore be implemented as first-in-first-out (FIFO) queues or buffers. The scheduler 210 may be used to implement some embodiments of the schedulers 110, 120, 135 shown in FIG. 1.

As discussed herein, the processor cores 201-203 may steal work from each other. For example, if the processor core 203 determines that the queue 207 is empty (or approaching an underflow condition), the processor core 203 may steal one or more tasks from the queues 205, 206 associated with the processor cores 201-202. Some embodiments of the scheduler 210 support work stealing by receiving feedback from the processor cores 201-203 or the queues 205-207 indicating an empty queue or underflow condition. The scheduler 210 may therefore reschedule a task that was previously scheduled for execution by one of the processor cores 201-203 for execution by the processor core associated with the empty queue.

Rescheduling the task may include removing the task from one of the queues 205-207 and providing the task to the empty queue. Rescheduling the task may also include activating an idle processor core (associated with the empty queue), migrating the task over a network between the queues 205-207, reading information associated with the task from a memory or disk and writing the information into a memory or cache associated with the processor cores 201-203, and the like. Migrating the task between the queues 205-207 during work stealing therefore incurs power consumption costs and savings associated with the rescheduling process. The scheduler 210 may therefore selectively steal tasks from the queues 205-207 based on the additional power consumption incurred by migrating the task between the queues 205-207.

Some embodiments of the scheduler 210 support work stealing based upon thermal characteristics such as temperatures in the processor cores 201-203. The processor cores 201-203 may therefore include thermal sensors 211, 212, 213 (referred to collectively as "the thermal sensors 211-213") that are used to measure temperatures in the corresponding processor cores 201-203. The scheduler 210 may receive feedback from the processor cores 201-203, as indicated by the arrow 215. In the interest of clarity, FIG. 2 includes a single feedback arrow 215 from the processor core 201 but feedback may also be received from the processor cores 202 and 203. The feedback includes information indicating temperatures measured by the corresponding thermal sensors 211-213.

Figure 3:
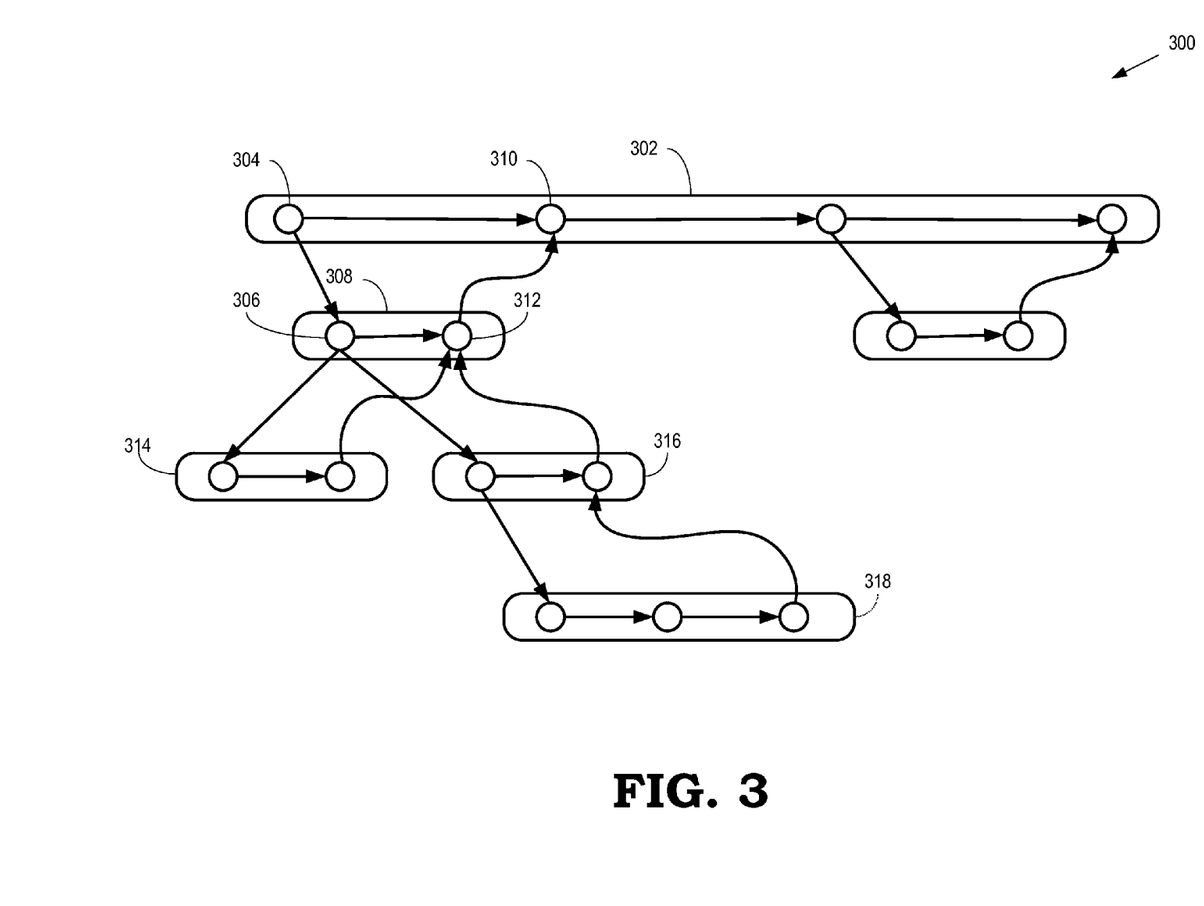
FIG. 3 is a diagram illustrating a model of a multithreaded computation according to some embodiments.

FIG. 3 is a diagram illustrating a model 300 of a multithreaded computation according to some embodiments. The multithreaded computation may be performed by some embodiments of the processing system 100 shown in FIG. 1 or the processing system 200 shown in FIG. 2. Threads in the multithreaded computation include one or more tasks. The multithreaded computation includes a procedure 302 that begins by executing a thread 304, which may be scheduled for execution by a processor core by a scheduler such as one or more of the schedulers 110, 120, 135 shown in FIG. 1 or the scheduler 210 shown in FIG. 2. The procedure 302 may be considered the top or first level of the model 300. The thread 304 spawns a child thread 306 that is part of a child procedure 308, which is in a lower or second level of the model 300. The thread 304 also spawns a successor thread 310 to receive the results generated by a successor thread 312 that is spawned by the child thread 306 to receive results generated by threads in other lower-level procedures 314, 316, 318.

The scheduler initially schedules all of the threads in the main procedure 302 and any threads that are spawned from these threads for execution by the same processor core, e.g., by adding the threads to a queue associated with the processor core. Thus, depending on the number of generations of threads or procedures that are spawned from the main procedure 302, the (first) processor core may be responsible for executing a much larger number of threads than other (second) processor cores in the processing system. One or more of the second processor cores may therefore become idle while waiting for the first processor core to finish executing the procedure 302. In order to balance the load among the processors and improve overall execution time and performance, some embodiments of the second processor cores selectively steal work (e.g., threads or tasks) from the first processor.

Work stealing may be performed based on estimates of the additional power consumed by rescheduling one or more threads from the first processor core to one of the second processor cores. For example, a work stealing algorithm implemented in the scheduler may indicate that the execution time of the procedure 302 is reduced if the second processor core steals threads in the child procedure 318 from the first processor core. The scheduler may then determine whether to steal the threads in the child procedure 318 based on a comparison of power consumption savings if the second processor core does not steal the thread and power consumption costs if the second processor core steals the thread. In some embodiments, the power consumption savings may include a difference between power consumption in an active mode and power consumption in an idle mode of the second processor core. For example, if the second processor core does not steal the thread, the second processor core can be placed in the idle mode, thereby saving the difference in power consumption between the idle and active modes. The power consumption costs may include power consumption to transfer information between the first processor core and the second processor core, power consumption to retrieve information from a memory or a disk, a difference between rates of active mode power consumption by the first processor core and the second processor core, and the like.

Figure 4:
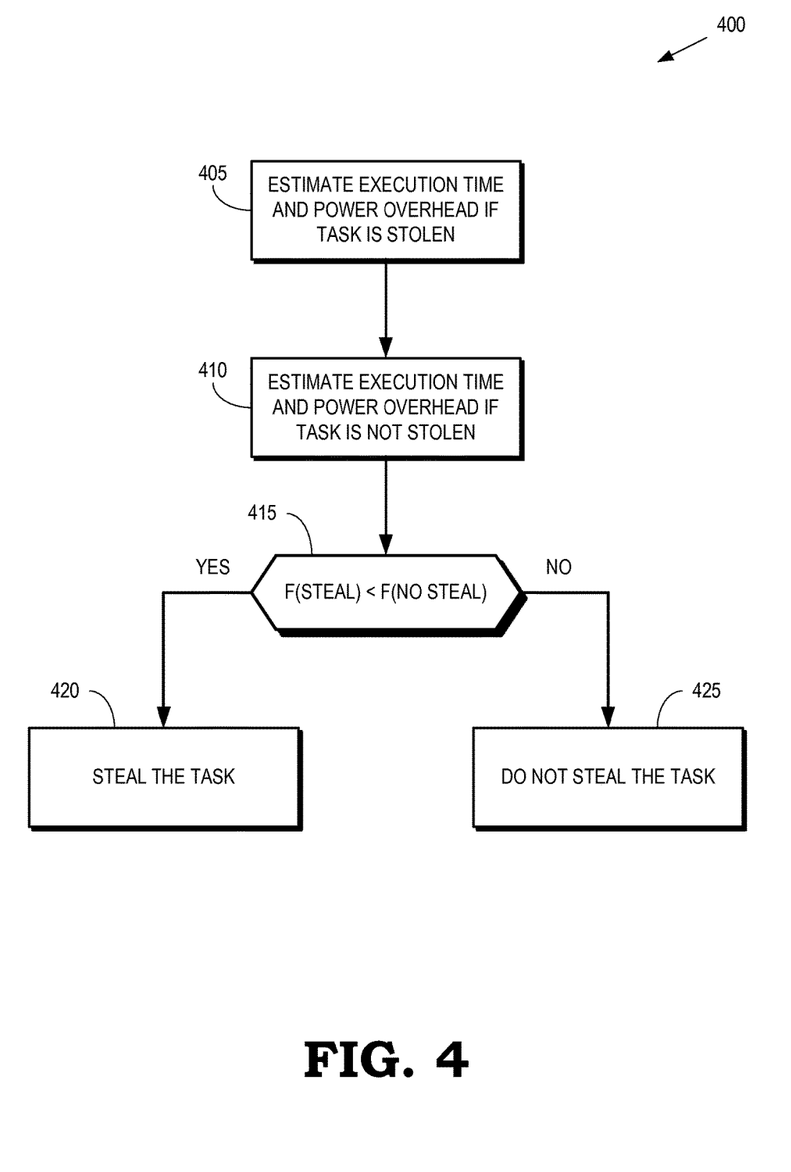
FIG. 4 is a flow diagram of a method for determining whether to steal a task according to some embodiments.

FIG. 4 is a flow diagram of a method 400 for determining whether to steal a task according to some embodiments. The method 400 may be implemented in some embodiments of the processing system 100 shown in FIG. 1 or the processing system 200 shown in FIG. 2. For example, the method 400 may be implemented in some or all of the schedulers 110, 120, 135 shown in FIG. 1 or in the scheduler 210 shown in FIG. 2. Initially, a scheduler has scheduled a task for execution by a first processor core. The task may therefore be resident in a first queue associated with the first processor core while the task awaits execution by the first processor core. The method 400 is used to determine whether a second processor core should steal the task, e.g., whether the task should be removed from the first queue and provided to a second queue to await execution by the second processor core. Stealing the task may also include moving other information such as cached data or instructions from a memory or cache associated with the first processor core to a memory or cache associated with the second processor core. The task is one of a plurality of tasks that are included in a procedure that is scheduled for execution by the first processor core.

At block 405, the scheduler estimates an execution time and a power overhead for the plurality of tasks that would result if the task was stolen by the second processor core. For example, the execution time and the power overhead may be estimated as:

$$\text{Runtime}_{steal} = f_1(\text{Quality of WS Algorithm}) \quad (1)$$

$$\text{Power Overhead}_{steal} = f_2 \ (\text{Network Power}) + f_3 \ (\text{Disk Power}) \quad (2)$$

Equation (1) indicates that the overall execution time for the plurality of tasks if one or more tasks is stolen by the second processor core is a function of the quality of the work stealing algorithm implemented by the scheduler. For example, an ideal work stealing algorithm can reduce the overall execution time of a plurality of tasks by half by perfectly sharing the work between the first processor core and the second processor core. However, a less than ideal work stealing algorithm provides a smaller reduction in the overall execution time. Allowing work stealing by more processor cores can further reduce the overall execution time because multiple processor cores can concurrently execute the stolen tasks. Equation (2) indicates that the additional power consumption (or overhead) resulting from stealing tasks is a function of the power consumption required to move data or instructions over a network between the first and second processor cores and the disk power consumed by reading/writing data or instructions from/to disks or memories associated with the first and second processor cores. Other sources of power overhead may also be included in some embodiments of equation (2), such as the power consumed by an active processor core if the processor core was previously idle.

At block 410, the scheduler estimates an execution time and a power overhead for the plurality of tasks if the task is not stolen by the second processor core. For example, the execution time and the power overhead may be estimated as:

$$\text{Runtime}_{No\ Steal} = f_4 \ (\text{Serialized Execution Time}) \quad (3)$$

$$\text{Power Overhead}_{No\ Steal} = f_5 \ (\text{Idle Chip Power}) \quad (4)$$

Equation (3) indicates that the execution time for the plurality of tasks is equal to the sum of the execution times for the individual tasks if no work stealing is performed because the individual tasks are executed in series by the first processor core. Equation (4) indicates that the power overhead associated with not stealing work corresponds to the idle chip power because the second processor core can be placed in the idle mode if the second processor core does not steal work from the first processor core. Thus, if no work stealing is performed, the power consumption is reduced by an amount that is approximately equal to the difference between the power consumed in the active mode and power consumed in the idle mode of the second processor core.

At decision block 415, the scheduler compares estimated values of a function for the case in which the task is stolen and the case in which the task is not stolen. Some embodiments of the function are expressed as:

$$F(x) = \alpha * f_6(\text{Execution Time} * \text{Power Overhead}) + \beta * f_7 \ (\text{Power Overhead}) + \gamma * f_8(\text{Execution Time}) \quad (5)$$

$$\text{Steal a task } iff: F(\text{Steal}) < F(\text{No Steal}) \quad (6)$$

The abbreviation "iff" in equation (6) is understood to mean "if and only if." The first term on the right hand side of equation (5) is a product of the run time and the power overhead, which is proportional to the energy consumed by executing the tasks for the estimated execution time at the corresponding power overhead. The second term on the right-hand side of equation (5) is a function of the power overhead, which is a proxy for the additional power consumption incurred by the scheduling decision, and the third term on the right-hand side of equation (5) is a function of the execution time, which is a proxy for performance. The parameters $\alpha$, $\beta$, $\gamma$ are used to weight or prioritize the relative importance of energy consumption, additional power consumption, and performance. These parameters may be determined empirically, theoretically, or experimentally. For example, the parameters may be determined based on measurements of performance of the system for different values of the parameters, theoretical predictions of the performance for different values of the parameters, and the like.

The second processor core steals the task (at block 420) if the scheduler determines that F(Steal)<F(No Steal). Otherwise, the second processor core does not steal the task (at block 425).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
   first and second processor cores to concurrently execute tasks; and
   a scheduler that schedules tasks for execution by the first and second processor cores,
   wherein the first processor core is configured to selectively steal a task that was previously scheduled for execution by the second processor core, wherein the stealing reduces overall execution time by spreading workload over multiple processor cores and considers potential costs of additional power consumption due to migrating the tasks between the processor cores, based on:
      an estimate, determined by the scheduler, of additional power consumption that would be incurred by migrating the task from the second processor core to the first processor core, and
      a comparison of a first estimated value of a function of an execution time and a power consumption if the task is stolen and a second estimated value of the function if the task is not stolen.

2. The apparatus of claim 1, wherein the first estimated value represents a difference between power consumption in an active mode and power consumption in an idle mode of the first processor core.

3. The apparatus of claim 2, wherein the second estimated value represents an estimate of at least one of power consumption to transfer information between the first processor core and the second processor core, power consumption to retrieve information from a memory or a disk, and a difference between rates of active mode power consumption by the first processor core and the second processor core.

4. The apparatus of claim 1, wherein the function of the execution time and the power consumption is a function of the execution time, the power consumption, and a product of the execution time and the power consumption.

5. The apparatus of claim 1, wherein the first processor core is further configured to selectively steal the task from the second processor core based on a comparison of first estimated temperatures of the first processor core and the second processor core if the task is stolen and second estimated temperatures of the first processor core and the second processor core if the task is not stolen.

6. The apparatus of claim 1, further comprising:
   first and second queues associated with the first and second processor cores, respectively, wherein the second queue is to receive the task in response to the scheduler scheduling the task on the second processor core, and
   wherein the first queue is to receive the task from the second queue in response to the first processor core stealing the task from the second processor core.

7. The apparatus of claim 1, wherein the first and second processor cores are implemented in at least one of a processing unit, a server that comprises a plurality of processing units, and a computing cluster that comprises a plurality of servers.

8. A method, comprising:
   scheduling a task, by a scheduler, on a first processor core that is configured to concurrently execute tasks with a second processor core;
   selectively stealing the task from the first processor core for execution by the second processor core, wherein the stealing reduces overall execution time by spreading workload over multiple processor cores and considers potential costs of additional power consumption due to migrating the tasks between the processor cores, based on a determination by the scheduler of an additional power consumption incurred by migrating the task from the first processor core to the second processor core; and
   comparing a power consumption savings if the second processor core does not steal the task to power consumption costs if the second processor core steals the task, wherein selectively stealing the task includes selecting the task from the first processor core in response to the power consumption savings being smaller than the power consumption costs.

9. The method of claim 8, wherein the power consumption savings comprises a difference between power consumption in an active mode and power consumption in an idle mode of the first processor core.

10. The method of claim 8, wherein the power consumption costs comprise at least one of power consumption to transfer information between the first processor core and the second processor core, power consumption to retrieve information from a memory or a disk, and a difference between rates of active mode power consumption by the first processor core and the second processor core.

11. The method of claim 8, further comprising:
    estimating a first value of a function of an execution time and a power consumption if the task is stolen; and
    estimating a second value of the function if the task is not stolen, wherein the second processor core is configured to selectively steal the task from the first processor core based on a comparison of the first value and the second value.

12. The method of claim 11, wherein the function of the execution time and the power consumption is a function of the execution time, the power consumption, and a product of the execution time and the power consumption.

13. The method of claim 8, further comprising:
estimating first temperatures of the first processor core and the second processor core if the task is stolen; and
estimating second temperatures of the first processor core and the second processor core if the task is not stolen, wherein the first processor core is configured to selectively steal the task from the second processor core based on a comparison of the first temperatures and the second temperatures.

14. The method of claim 8, wherein scheduling the task on the first processor core comprises placing the task in a first queue associated with the first processor core, and wherein selectively stealing the task comprises moving the task from the first queue to a second queue associated with the second processor core.

15. A non-transitory computer readable storage medium embodying a set of executable instructions, the set of executable instructions to manipulate at least one processor to:
schedule a task by a scheduler on a first processor core that is configured to concurrently execute tasks with a second processor core; and
selectively steal the task from the first processor core for execution by the second processor core based on a determination by the scheduler of an additional power consumption incurred by migrating the task from the first processor core to the second processor core; wherein the first processor core is configured to selectively steal the task from the second processor core, wherein the stealing reduces overall execution time by spreading workload over multiple processor cores and considers potential costs of additional power consumption due to migrating the tasks between the processor cores, based on a comparison of a first estimated value of a function of an execution time and a power consumption if the task is stolen and a second estimated value of the function if the task is not stolen.

16. The non-transitory computer readable storage medium of claim 15, wherein the first processor core is to selectively steal the task from the second processor core based on a comparison of power consumption savings if the first processor core does not steal the task and power consumption costs if the first processor core steals the task.

* * * * *